Patented June 2, 1936

2,042,814

UNITED STATES PATENT OFFICE 2,042,814

PRODUCTION OF MANGANESE DIOXIDE

Charles S. Vadner, Winnemucca, Nev.

No Drawing. Application March 2, 1931,
Serial No. 519,701

6 Claims. (Cl. 23—145)

The objects of my invention are to treat manganese ores of any manganese content that can be profitably treated by means of sulphur dioxide gas or sulphurous fumes in the presence of sufficient water, and to recover the manganese and other metals contained in said ore, mineral matter and otherwise, in the form of valuable products, by-products and metallic state, as may be. It is well known that along with manganese ores, are found many of the common metals principally iron, silica, calcium, etc., and in some cases, tungsten, mercury, silver and others.

Oxids, carbonates, or sufficiently roasted sulphids and silicious ores of manganese are ground to the proper size and showered or sprayed in water down through the first of a series of solution towers. These towers are of a suitable size and height according to the quality and quantity of the ore that it is proposed to treat. Towers or tanks singly or in series may be used. The sulphurous fumes are suitably led into these solution towers and tanks and therein mingled with the sprayed or agitated ore pulp. This spraying and mingling of the pulp, in the presence of water, to the solvent action of the sulphurous fumes, results in the solution of the manganese together with some of the iron and other metals contained in said manganese ore, as may be. The manganese solution containing iron, lime, other mineral impurities and possibly an excess of sulphurous fumes, may be treated with such an additional amount of raw manganese ore as will absorb the excess amount of sulphurous fumes meanwhile precipitating out iron, lime and other mineral impurities. It is well understood that air, heat, additional sulphurous fumes and manganese ore may be used, and that these agencies may be used singly or in conjunction with one another, as may be found best suited to serve the ends of the process.

The action of sulphur dioxid gas on manganese ore is in most cases exothermic, nevertheless on a commercial scale with varying contents of such ores in manganese and proportions of water as may be, the temperature may be regulated to a more or less degree in accomplishing the desired ends of the operations and to duration of the dissolution period, by regulating the supply of gas.

In practical operations the resulting solution from the above action, reactions and complex interactions, will be manganese dithionate and some sulphate, due to the various oxid compounds and otherwise found in commercial ores.

The manganese solution is treated with ammonia, either in the gaseous or the liquid form, concurrently with air or at any advantageous time during the process, and finally insoluble dimanganic dioxid dihydroxid, $Mn_2O_2(OH)_2$ is obtained, which is filtered, washed, dried and converted to a blackish oxid by gentle calcination in air or best in presence of moist air. The clarified filtrate from the above precipitation is recovered as is, and can be further suitably oxidized and recovered by evaporation, crystalization, as a sulpho-ammonio-salt. Calcining the above dimanganic-dioxid dihydroxid in a moist atmosphere suitably adding moisture during the progress of the calcination at a temperature range from 250° C. to 400° C. will give a 52.5% to 92.5% conversion of the hydrated oxid to manganese dioxid.

One hour of calcination is necessary when a pure but low conversion product is desired.

Up to thirty-six hours calcination may be necessary due to a caked condition of the hydrated oxid due to a dry hard initial product, lack of skill in the art, poor mechanical construction and/or additions of excesses of moisture.

A short calcination and the minimum possible of moisture will yield a 52.5% or thereabout product.

A dry, hard, coarse initial product is useful in obtaining a low 52.5% final product. The fineness of the product treated must be given consideration. A 92.5% conversion is best had by a fine, moist pure initial product carefully agitated in a slow, steady, moist atmosphere ranging in temperature from about 250° C. to below 400° C.

This condition will reduce the operating time to the shortest time possible consistent with the quality and the depth of the charge in the calcining operation.

The 100 hour calcination is the undesirable procedure excepting when the initial product is in such a bad condition that the long calcination period is necessary.

The presence of moisture during the calcination period is beneficial by way of assisting and speeding up of the oxidization and conversion of the dimanganic-dioxid-dihydroxid to manganese dioxid.

Having described my invention, what I desire to secure by Letters Patent is:—

1. The process of producing manganese dioxid which comprises calcining manganic-dioxid-dihydroxid in the presence of moist air whereby an oxid of varying contents of manganese dioxid is obtained.

2. The process of producing manganese dioxid which comprises calcining dimanganic-dioxid-dihydroxid in moist air, thereby producing an oxid containing a high percentage of manganese dioxid substantially as described.

3. The process of producing manganese dioxid which comprises calcining dimanganic dioxid-dihydroxid in the presence of air and moisture at the minimum temperature of formation but below 400° C.

4. The process of producing manganese dioxid which comprises calcining dimanganic-dioxid-dihydroxid in the presence of air and moisture at the minimum temperature of formation but below 400° C. and averaging 250° to 305° C.

5. The process of producing manganese dioxid, which consists in treating a solution of manganese dithionate with ammonia and air, removing and calcining the formed dimanganic-dioxid-dihydroxid in the presence of moist air at the minimum temperature but below 400° C., averaging 250° to 305° C., and recovering the manganese dioxid substantially as described.

6. The process of producing manganese dioxid which comprises treating a solution of manganese dithionate with ammonia and air removing and calcining the recovered precipitated dimanganic-dioxid-dihydroxid in the presence of moist air at the minimum temperature below 400° C., producing the largest amount of manganese dioxid, and recovering the ammonio-sulpho compound in the filtrate of the precipitated dimanganic-dioxid-dihydroxid substantially as described.

CHARLES S. VADNER.